United States Patent [19]
Petersen et al.

[11] Patent Number: 5,125,430
[45] Date of Patent: Jun. 30, 1992

[54] PRESSURE DIFFERENCE RELIEF VALVE FOR LIQUID CONTAINERS

[75] Inventors: Anders I. D. Petersen; Hans-Henrik P. Raagaard, both of Lynge, Denmark

[73] Assignee: Pres-Vac A/S, Allerod, Denmark

[21] Appl. No.: 796,572

[22] Filed: Nov. 22, 1991

[51] Int. Cl.⁵ .......................... F16F 7/08; F16K 31/72
[52] U.S. Cl. ...................... 137/514; 251/64; 188/67
[58] Field of Search .............. 137/514; 251/64; 92/167; 188/67, 156, 158, 378

[56] References Cited

U.S. PATENT DOCUMENTS

| | | | |
|---|---|---|---|
| 2,091,507 | 8/1937 | Hall, Jr. | 188/67 X |
| 4,236,609 | 12/1980 | Carlsson | 188/67 |
| 4,563,004 | 1/1986 | Mattox | 188/67 X |
| 4,890,641 | 1/1990 | Gavrila | 137/514 |

Primary Examiner—John Rivell
Attorney, Agent, or Firm—Pravel, Gambrell, Hewitt, Kimball & Krieger

[57] ABSTRACT

A pressure difference relief valve, viz. a pressure relief valve or a vacuum relief valve, for a liquid container has a valve body which opens or closes a valve opening of a valve housing in response to the pressure difference between the interior of the valve housing and the ambient atmosphere. The valve body is connected to a slidably mounted stem. The valve is constructed with spring elements which are clamped against the stem from opposite sides thereof at a controlled force to create a frictional resistance to sliding movement of the stem. Hereby any tendency of the valve to vacillate between the closed position and a fully open position under the influence of fluctuations of the gas or air flow, e.g. caused by turbulence, is eliminated or reduced.

9 Claims, 3 Drawing Sheets

PRESSURE DIFFERENCE RELIEF VALVE FOR LIQUID CONTAINERS

FIELD OF THE INVENTION

This invention relates to a valve for pressure difference relief between a liquid container and the ambient atmosphere.

An important field of use of such relief valves is for the oil tanks of oil cargo vessels, and in the following explanation and description this field of use will be taken as point of departure, but it will be understood that the same principles will be equally applicable to other fields of use, e.g. for stationary storage tanks or for rolling transportation tanks for liquid petroleum products or chemicals.

PRIOR ART

There are two categories of pressure difference relief valves, viz. pressure relief valves (venting valves) and vacuum relief valves. Examples of these are disclosed in U.S. Pat. No 5,060,688.

A pressure relief valve is opened against a built-in closing force by the pressure of the gas above the liquid level in the tank when this pressure rises to a value above that of the ambient atmosphere beyond a predetermined value, referred to as the opening pressure. It is closed when the gas pressure drops below the opening pressure.

When oil is loaded into the tank at a certain volumetric rate, gas must escape through the pressure relief valve at the same volumetric rate. The valve is designed for a maximum permissible loading rate, at which the pressure drop across the valve assumes a maximum permissible value, which is chosen well below a prescribed safety limit to obtain ample safety against rupture, or even explosion, of the tank.

At the maximum permissible loading rate the valve assumes a fully open position defined by stop means. At a lower loading rate the valve assumes an intermediate position between the closed position and the fully open position.

The operation of a vacuum relief valve is exactly similar to that described, when considering the situation of unloading the tank, and substituting "relative vacuum" for "pressure above that of the ambient atmosphere", and substituting "collapse" for "explosion".

Whenever a relief valve of either category is in an intermediate position, its flow-control element is sensitive to fluctuations of the rate of gas flow caused e.g. by turbulence or non-uniform distribution of the flow. The resulting vibratory movement of the flow control element will act back on the rate of flow, and thereby a reciprocal-amplifying effect may be initiated which may cause the valve to vacillate forth and back between the fully open and the closed position. Thereby the valve may be subjected to a series of heavy clashes of metal against metal, which is in itself undesirable for mechanical reasons and besides may produce a heavy noise, which may even be amplified by the tank wall as a reverberator.

SUMMARY OF THE INVENTION

It is an object of the invention to remedy this drawback without in any way jeopardizing the regular operation and the safety functions of the valve.

Briefly speaking, the salient feature of the invention is the provision of springs which are symmetrically clamped against a slidably mounted stem of the valve from opposite sides thereof in such a manner as to create an accurately controlled frictional resistance to slidable movement of the stem, thereby eliminating or reducing any tendency to vacillation.

More precisely, the invention, for which protection is sought, consists in the combinations of features set forth in the claims.

DESCRIPTION OF THE PREFERRED EMBODIMENTS

Figure 1:
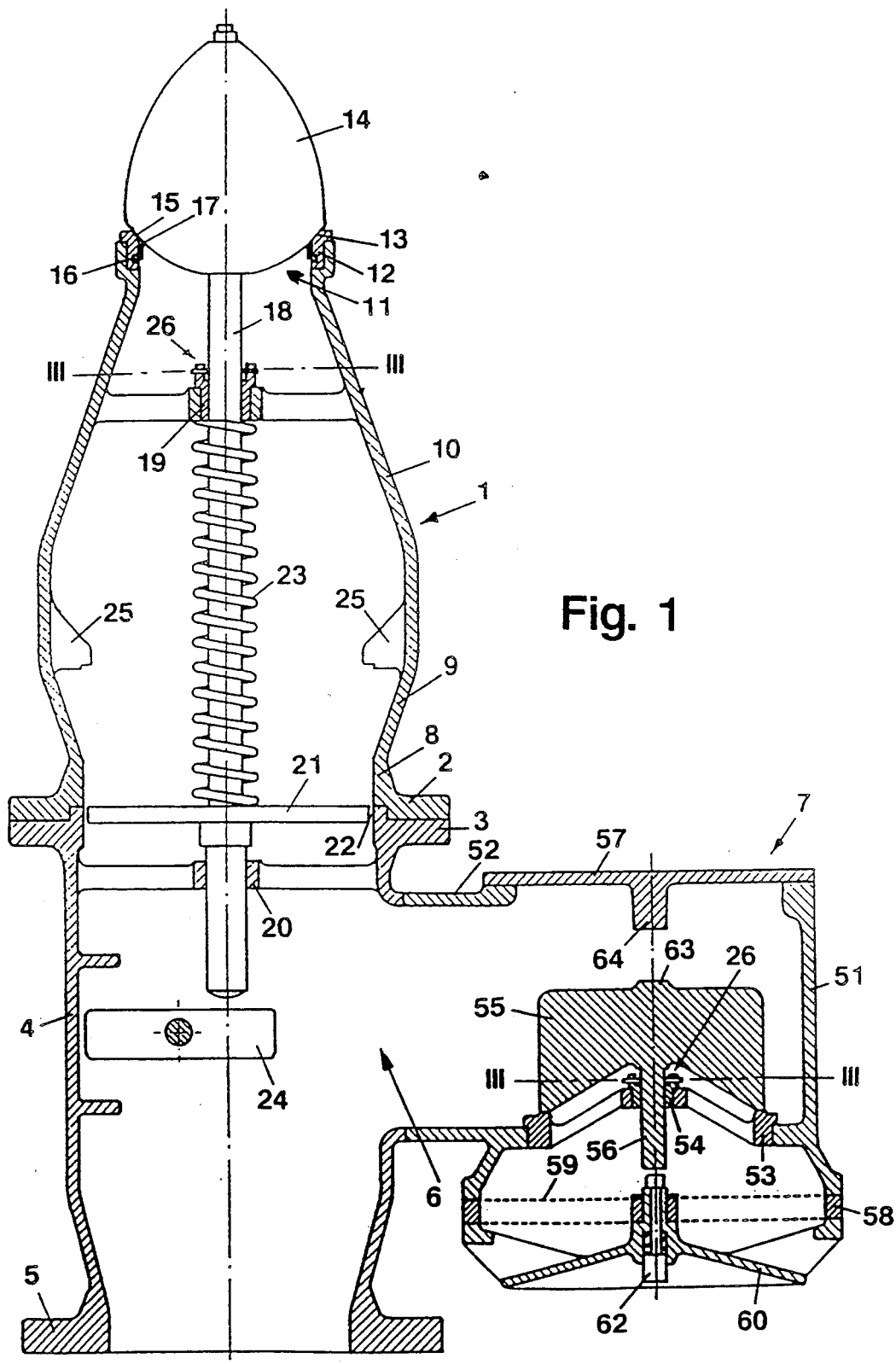
FIG. 1 is a vertical section through a pressure relief valve and a vacuum relief valve built together and each constituting an embodiment of the invention.
Figure 2:
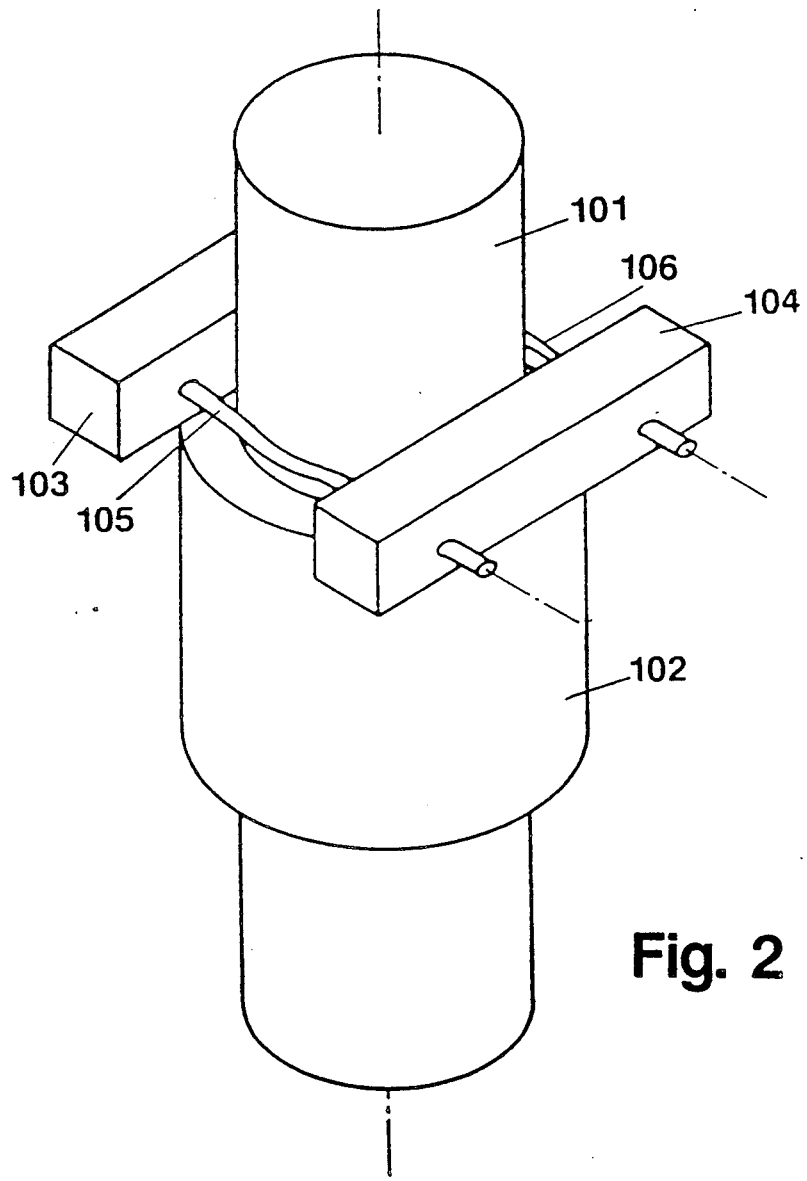
FIG. 2 is a perspective view on a larger scale of a frictional device, with which each of the relief valves of FIG. 1 is constructed.

Apart from the frictional device to be described further below with reference to FIGS. 2-4, the pressure relief valve of FIG. 1 is identical to that disclosed in U.S. Pat. No. 5,060,688.

1 is a vertically oriented valve housing, which at its lower end has a flange 2 which is bolted to a flange 3 of a tubular socket 4 constructed at its lower end with a flange 5 that can be bolted to a pressure relief outlet of an oil tank or to the upper end of a pressure relief pipe connected to one or more tank compartments. In the embodiment shown, the socket 4 has a lateral opening 6 to which a vacuum relief valve 7 is connected, which will be described further below.

At its lower end, the valve housing has a cylindrical wall portion 8 which in a direction upwards is followed by a diverging wall portion 9 and thereafter a converging wall portion 10 which at the top of the valve housing is terminated by a blow off opening 11.

In the blow-off opening there is mounted a mouth ring 12 at the inner side of which a conical valve seat 13 is formed. In the blow-off opening 11 there is arranged a drop-shaped body 14 on the underside of which a conical valve surface 15 is formed which in the closed condition of the valve sealingly engages the valve seat 13.

For improving the tightness, an annular elastic gasket 16 may be arranged on the inner side of the mouth ring 12, said gasket having a lip 17 engaging the underside of the drop-shaped body 14.

A stem 18 is connected to the drop-shaped body and extends down through the housing where it is guided by an upper stem guide 19 in the valve housing and a lower stem guide 20 in the socket 4. The stem 18 carries a lifting disc 21 which is located in the interior of the cylindrical wall portion 8 and has a slightly smaller diameter than the latter so that a free passage slot 22 is formed around the lifting disc. Under the lower end of the stem 18 there is mounted a rocking lever 24 for use in check-lift of the valve.

A compressional spring 23 is interposed between the upper stem guide 19 and the lifting disc 21. Thus, the structure, referred to herein as the flow-off controlling member, comprising the drop-shaped body 14, the stem 18 and the lifting disc 21 is subjected to a downwardly directed closing force equal to the compressional force of the spring 23+the total weight of all parts of the structure. If these are so constructed that their own weight provides a suitable closing force, the spring 23 may be omitted.

If a pressure in excess of that of the atmosphere comes up in the tank, then, owing to the leakage through the slot 22, this pressure will propagate to the space above the lifting disc 21, and this will therefore be subjected to the same pressure from above and from below. A lifting force is therefore produced solely by the action of the excess pressure on the underside of the drop-shaped body. This lifting force is equal to the excess pressure multiplied by the cross-sectional area of the blow-off opening inside the valve seat.

When the lifting force exceeds the previously mentioned closing force, the valve is opened. This takes place at a predetermined value of the tank pressure, the opening pressure, which is pre-set by dimensioning the weight of the drop-shaped body 14, the stem 18 and the lifting disc 21, which may be supplemented by an additional weight load and/or a compressional spring 23. When the blow-off commences at the opening of the valve, the pressure on the upper side of the lifting disc drops, and the net value of the lifting force becomes equal to the tank pressure multiplied by the area of the lifting disc. Since this is larger than the area of the blow-off opening, the lifting force is augmented, and thereby the lifting speed and hence the blow-off quantity per time unit are increased.

When the valve is further lifted, the lifting disc 21 arrives into the area of the diverging wall portion 9, whereby the blow-off quantity is further increased.

The upward movement of the flow-off controlling member 14, 18, 21 is limited by stop noses 25 extending inwards from the wall of the valve housing 1 into the path of movement of the lifting disc 21. When the lifting disc 21 strikes these noses 25, the valve is in a fully open position. The valve is so dimensioned that this position is reached, when the volumetric rate of the gas flow-off rises to a value corresponding to the maximum permissible loading rate. For further details of the construction, dimensioning and operation of the pressure relief valve, reference is made to U.S. Pat. No. 5,060,688.

When the tank is loaded at a volumetric rate less than the maximum permissible value, the valve will assume an intermediate position between the closed position and the fully open position, and for the reasons previously explained vacillation between these positions may occur resulting in alternate clashes of the valve surface 15 of the drop-shaped body against the valve seat 13, and of the lifting disc 21 against the noses 25. The risk of vacillation particularly exists where the valve is connected to one or more tanks through pipes or conduits of considerable length and/or having bends or angles or other irregularities.

To eliminate or reduce the risk of vacillation, the valve is constructed with a frictional device 26 to be described further below with reference to FIGS. 2-4.

The vacuum relief valve 7 is of a conventional construction and corresponds to that illustrated in FIG. 1 of U.S. Pat. No. 5,060,688, but not described in detail in the specification of the patent.

The vacuum relief valve 7 has a valve housing 51 which at its left end is constructed with a connecting portion 52 connected to the socket 4.

The valve housing 51 has a bottom opening in which is mounted a valve seat 53 carrying a valve stem guide 54. The valve seat 53 is engaged by a valve body 55, which by means of a stem 56 is guided in the stem guide 54. The valve housing 51 is closed at its top by means of a cover 57.

At its bottom, the vacuum valve is in well-known manner constructed with a net ring 58 carrying a double flame arresting net 59, and with a shield 60 having a hub 61 accomodating a check-lifting button 62.

The valve body 55 is urged towards the valve seat by a built-in closing force which in the embodiment illustrated is constituted by the gravity of the valve body. In the vacuum condition of the tank, the closing force is counted-acted by a lifting force which is equal to the free are of the underside of the valve body 55 multiplied by the pressure difference between the underside and the upper side of the valve body, i.e. between the ambient pressure and the pressure in the valve housing, and thereby in the tank with which the vacuum valve is connected. If a vacuum comes up in the tank, the valve body will be lifted when the lifting force exceeds the closing force, and thereby air will flow from the surroundings via the valve opening and the interior of the valve housing to the tank. When the pressure in the tank thereby rises to a value equal to the ambient pressure less the pressure drop across the valve, the lifting force will be equal to the closing force, and the valve is again closed.

The upward movement of the valve body is limited by the engagement of an upward projection 63 on the valve body 55 with a downward projection 64 on the cover 57, thereby defining a fully open position of the valve. The valve is so dimensioned that this position is reached when the volumetric rate of the air inflow rises to a value corresponding to the maximum permissible unloading rate.

When the tank is unloaded at a volumetric rate less than the maximum permissible value, the valve will assume an intermediate position between the closed position and the fully open position, and for the reasons previously explained vacillation between these positions may occur resulting in alternate clashes between the valve body 55 against the valve seat 53, and of the projections 63 and 64 against each other. As will be seen the situation is exactly the same as for the pressure relief valve, and the remedy proposed according to the invention is again the provision of a frictional device 26, which will now be described with reference to FIGS. 2-4.

In these figures, 101 is a stem representing the stem 18 of the pressure relief valve 1 or the stem 56 of the vacuum relief valve of FIG. 1 102 is a bushing forming a stem guide, which slidably supports the stem 101 and thus represents the stem guide 19 of the pressure relief valve 1 or the stem guide 54 of the vacuum relief valve 7.

At its upper end the stem guide carries two traverses 103 and 104 which extend perpendicularly to a diametrical plane of the stem 101 on opposite sides of the stem. The traverses 103 and 104 may be separate elements attached to the upper end of the stem guide 102 by any suitable means, but preferably the stem guide and the traverses are made in one piece, e.g. from a unitary workpiece which comprises a cylindrical portion and a block of rectangular cross-section and is shaped into the required configuration and to accurate measures by machine tool operations.

The traverses 103 and 104 serve as spring holders for two spring wires 105 and 106, which are mounted in holes 103a, 103b and 104a, 104b of the traverses 103 and 104, respectively. The distance between the holes 103a, 103b/104a, 104b of each traverse is slightly smaller than the diameter of the stem 101, so that the spring wires will be bent in a shallow arc and will thereby be urged against diametrically opposite areas of the cylindrical surface of the stem 101 so as to create a frictional force opposing sliding movement of the stem.

Figure 3:
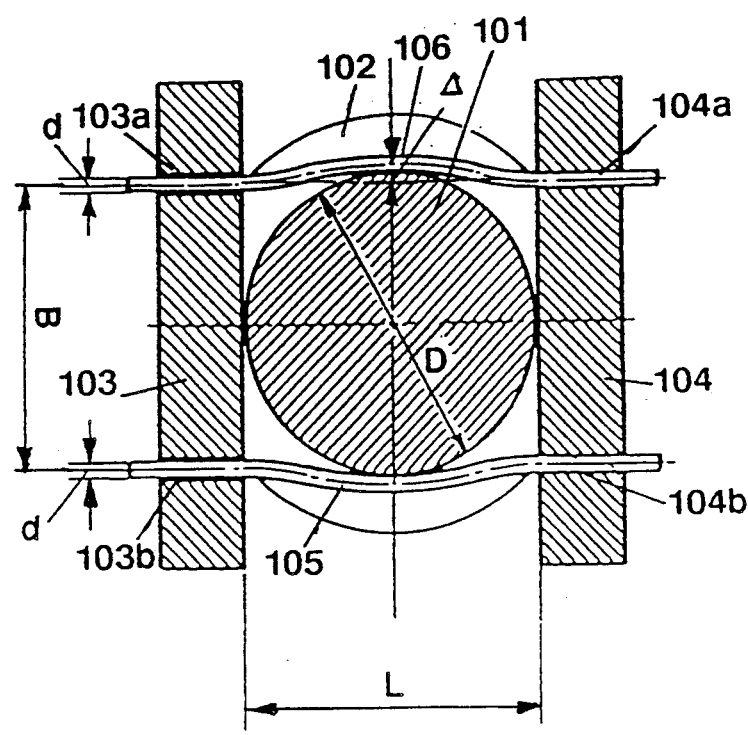
FIG. 3 is a horizontal section through the frictional device of FIG. 2, taken along either of the lines III—III in FIG. 1.
Figure 4:
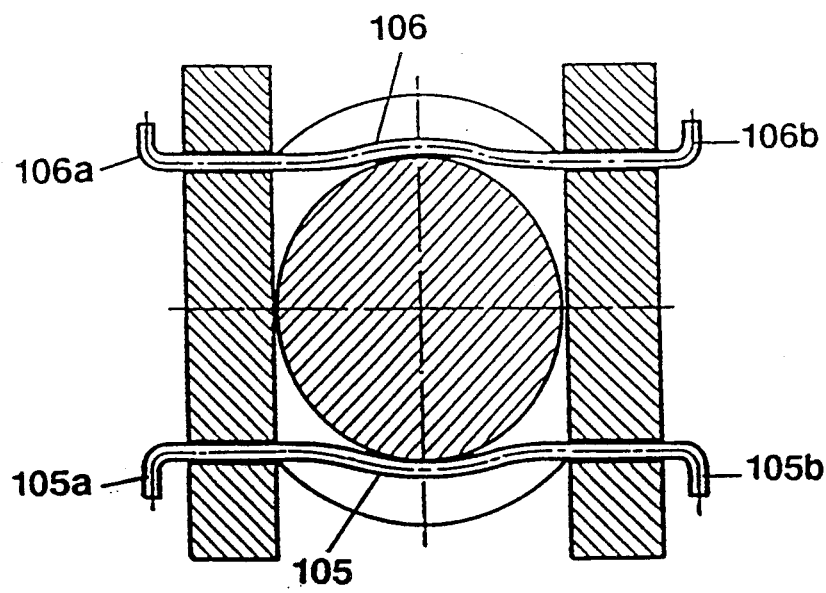
FIG. 4 is a corresponding horizontal section through a slightly modified embodiment.

In the embodiment of FIG. 3, the wires 105 and 106 are rigidly clamped or otherwise fastened in the holes 103a and 103b, but freely slidable in the holes 104a and 104b, so that they will never be subjected to axial stresses, but only to a bending stress which is determined exclusively by the geometrical configuration of the system. In the embodiment of FIG. 4, the same effect is obtained by mounting the spring wires 105,106 freely slidably in the holes of both traverses 103,104 and bending up their ends at a right angle to form stops 105a, 105b and 106a, 106b preventing the wires from sliding out of engagement with the holes of the traverses.

In FIG. 3, the dimensions of the various parts of the arrangement are designated as follows:
D = diameter of stem,
L = distance between inner sides of traverses,
B = distance between spring mounting positions of each traverse,
d = diameter of spring,
Δ = deflection of spring.

It will be seen that $$\Delta = \frac{D - B + d}{2} \qquad \text{I.}$$

Thus, the deflection Δ, and hence the spring force, can be calculated determinately from the dimensions D, B and d, and by suitably selecting these dimensions it will therefore be possible to obtain a spring force creating a frictional resistance which is substantially smaller than both the built-in closing force and the net opening force occurring at a maximum permissible pressure difference between the interior of the valve housing and the ambient atmosphere. Such a frictional resistance can never prevent opening or closing of the valve in response to the pressure difference between the interior of the valve housing and the ambient atmosphere—which might have disastrous results—and it has been found that even a frictional resistance amounting to a small fraction only of the forces mentioned will normally suffice for preventing vacillation as a consequence of irregularities of the flow of gas or air through the valve.

It is desirable that the frictional force should remain as nearly as possible constant at ambient temperature variations within a relatively large interval, say from −50° C. to +50° C.

From equation I it will be seen that the spring deflection, and hence the frictional force primarily depends on D − B. By making the stem and the spring holders from materials having substantially the same coefficient of thermal expansion, certainty is therefore obtained that the variation of the spring deflection at ambient temperature variations within the contemplated interval of 100° C. will be limited to a small percentage, viz. the same percentage as that of the thermal expansion or contraction of the stem and the spring holders.

Advantageously, the stem and the spring holders can be made from the same material. Preferred construction materials for these elements are stainless steel or bronze alloys. The same applies to the stem guide, which, as previously mentioned, may suitably be integral with the spring holders. The spring elements are preferably made from stainless steel.

Since the absolute value of the spring deflection is approximately proportional to D − B, the variations of this absolute value within the contemplated temperature interval can be kept at a minimum by making D − B as small as possible, i.e. by so selecting the geometrical configuration of the frictional device that the distance between the mounting positions of one spring element and the other in each traverse is slightly smaller than the diameter of the stem.

At a given deflection of a given spring, the spring force will be the greater, the smaller the free length of the springs. To obtain the required spring force at a small value of the deflection it is therefore recommendable to make the distance L between the inner sides of the traverses as small as possible, i.e. by so arranging the traverses that their inner sides are located immediately adjacent to, but not in contact with the surface of the stem.

In a numerical example, the dimensions indicated in FIG. 3 are as follows:
D = 20.0 mm
L = 20.5 mm
B = 19.0 mm
d = 1.0 mm
hence
Δ = 1.0 mm.

It has been found in practice that satisfactory results can be obtained if the distance L between the inner sides of the traverses is so selected as to leave a clearance of a few tenths of a millimeter between each traverse and the stem, and the spring bending elasticity and the spring deflection at 20° C., as determined by equation I, are so selected that the frictional resistance created by the springs is less than 25% of both the built-in closing force and the net opening force occurring at a maximum permissible pressure difference between the interior of the valve housing and the ambient atmosphere, and more than 5%, preferably 10–15%, of the lower one of these limits, which is normally the built-in closing force.

It is a further advantage of the arrangement described that the frictional device as a whole forms a very compact structure and therefore interferes as little as possible with the flow or gas or air through the valve housing.

In the preferred embodiment, where the traverses are integral with the stem guide, the still further advantage is obtained that the frictional device forms a self-contained unit that can be mounted in an existing pressure difference relief valve.

Moreover, since the frictional device is held in correct position relative to the stem by the stem itself, the frictional force is immune to any deformations or dimensional changes to which other parts of the valve may be subjected, and can therefore never rise to a value jeopardizing the regular operation and the safety functions of the valve.

It will be understood that the spring wires described can be replaced by leaf springs mounted in slots of the traverses without in any way changing the principles of operation.

The frictional device according to the invention can also be used for flow control systems other than pressure difference relief valves or for operative systems in general, where similar problems are encountered in connection with a slidably mounted stem.

We claim:

1. A valve for pressure difference relief between a liquid container and the ambient atmosphere, comprising a valve housing, means for connecting the interior of said valve housing to the top of a liquid container to be served by the valve, a valve opening providing a flow passageway between the interior of the valve housing and the ambient atmosphere, a valve body adapted to close and to open said valve opening under the influence of a structurally built in closing force in combination with an opening or closing force resulting from the pressure difference between the interior of the valve housing and the ambient atmosphere, a cylindrical stem connected with said valve body, means for guiding said stem in a rectilinear path between end positions in which the valve body is in its closing position and in a fully open position, respectively, two stationary spring holders located on opposite sides of the stem, and two wire- or leaf-shaped spring elements mounted in said spring holders in such a manner as to be elastically clamped against diametrically opposite areas of the surface of the stem at a clamping force creating a frictional resistance which is substantially smaller than both the built-in closing force and the net opening force occurring at a maximum permissible pressure difference between the interior of the valve housing and the ambient atmosphere.

2. A valve as in claim 1, in which each of the spring elements is fixedly mounted in one of the spring holders and slidably mounted in the other spring holder.

3. A valve as in claim 1 in which each of the spring elements is slidably mounted in both spring holders and is provided with stop means for preventing it from sliding out of engagement with the spring holders.

4. A valve as in claim 1, in which the stem and the spring holders consist of materials having substantially the same coefficient of thermal expansion.

5. A valve as in claim 1 in which said means for guiding the stem comprise a stem guide in which the stem is slidably supported, and said spring holders consist of two traverses carried by said stem guide at one end thereof.

6. A valve as in claim 5 in which said stem guide and said traverses are made in one piece.

7. A valve as in claim 5, in which the inner sides of the traverses are located immediately adjacent to, but not in contact with the surface of the stem, and the distance between the mounting positions of one spring element and the other in each traverse is slightly smaller than the diameter of the stem.

8. A flow control device comprising a flow control member having a cylindrical stem, which is guided for rectilinear movement between positions defining different flow situations, two stationary spring holders located on opposite sides of the stem, and two wire- or leaf-shaped spring elements mounted in said spring holders in such a manner as to be elastically clamped against diametrically opposite areas of the surface of the stem at a clamping force creating a frictional resistance suitable for stabilizing the flow control member against vacillation.

9. A frictional device for attenuating the movement of a cylindrical stem forming part of an operative system and being guided for axial sliding movement under the influence of varying axial forces to which it is subjected during operation, said frictional device comprising two stationary spring holders located on opposite sides of the stem, and two wire- or leaf-shaped springs mounted in said spring holders in such a manner as to be elastically clamped against diametrically opposite areas of the surface of the stem.

* * * * *